United States Patent
Shah et al.

(10) Patent No.: US 12,353,288 B2
(45) Date of Patent: Jul. 8, 2025

(54) SYSTEMS AND METHODS FOR DATABASE MIGRATION

(71) Applicant: MicroStrategy Incorporated, Tysons Corner, VA (US)

(72) Inventors: Jay Shah, Aldie, VA (US); Michael Hudson, Roanoke, VA (US); Cezary Raczko, Falls Church, VA (US)

(73) Assignee: MicroStrategy Incorporated, Tysons Corner (VA)

( * ) Notice: Subject to any disclaimer, the term of this patent is extended or adjusted under 35 U.S.C. 154(b) by 123 days.

(21) Appl. No.: 17/207,945

(22) Filed: Mar. 22, 2021

(65) Prior Publication Data

US 2021/0303404 A1 Sep. 30, 2021

Related U.S. Application Data

(60) Provisional application No. 63/001,603, filed on Mar. 30, 2020.

(51) Int. Cl.
*G06F 11/14* (2006.01)

(52) U.S. Cl.
CPC ...... *G06F 11/1448* (2013.01); *G06F 2201/80* (2013.01)

(58) Field of Classification Search
CPC .......................... G06F 11/1448; G06F 2201/80
See application file for complete search history.

(56) References Cited

U.S. PATENT DOCUMENTS

| | | | | |
|---|---|---|---|---|
| 7,548,898 | B1* | 6/2009 | Tarenskeen | G06F 16/214 |
| 10,963,435 | B1* | 3/2021 | McAlister | G06F 11/0766 |
| 11,442,927 | B1* | 9/2022 | Mamidi | G06F 16/182 |
| 2004/0158820 | A1* | 8/2004 | Moore | G06F 8/51 |
| | | | | 717/136 |
| 2005/0125463 | A1* | 6/2005 | Joshi | G06F 16/972 |
| 2010/0070725 | A1* | 3/2010 | Prahlad | G06F 16/2272 |
| | | | | 718/1 |
| 2012/0265726 | A1* | 10/2012 | Padmanabhan | G06F 16/214 |
| | | | | 707/602 |
| 2015/0019488 | A1* | 1/2015 | Higginson | G06F 16/214 |
| | | | | 707/634 |
| 2017/0139966 | A1* | 5/2017 | Azoulay | G06F 40/137 |
| 2017/0344433 | A1* | 11/2017 | Bae | G06F 11/1456 |
| 2018/0060181 | A1* | 3/2018 | Rajamani | G06F 11/1469 |
| 2019/0339870 | A1* | 11/2019 | Meiri | G06F 11/1464 |

(Continued)

*Primary Examiner* — Tony Wu
(74) *Attorney, Agent, or Firm* — Bookoff McAndrews, PLLC

(57) ABSTRACT

Systems and methods are disclosed herein for migrating data from a source environment to a target environment. The source and target environments may have different database management systems and/or may be disposed on separate networks. In some embodiments, systems and methods disclosed herein may include identifying data for migration in the source environment, wherein identifying the data comprises identifying tables having a predetermined prefix value, setting customized properties in a data migration utility based on the data, creating a shell for the data in the target environment, using the data migration utility, creating an intermediary representation of the data, copying the intermediary representation to the target environment; and restoring the data from the intermediary representation into the shell in the target environment.

18 Claims, 6 Drawing Sheets

(56) References Cited

U.S. PATENT DOCUMENTS

| | | | |
|---|---|---|---|
| 2019/0340251 A1* | 11/2019 | Peddada | .................. H04L 9/16 |
| 2020/0073763 A1* | 3/2020 | Saini | ................... G06F 11/1469 |
| 2021/0209098 A1* | 7/2021 | Shi | ...................... G06F 16/2448 |
| 2021/0271648 A1* | 9/2021 | Arbel | .................... G06F 3/0647 |

* cited by examiner

SYSTEMS AND METHODS FOR DATABASE MIGRATION

RELATED APPLICATION(S)

This application claims priority to U.S. Provisional Application No. 63/001,603 filed Mar. 30, 2020, the entire disclosure of which is hereby incorporated herein by reference in its entirety.

TECHNICAL FIELD

Embodiments of the present disclosure relate generally to migrating data and associated tools between database environments having different management systems. More particularly, some aspects of the present disclosure relate to migrating data and associated analytical tools between database environments having different structured query language (SQL) management systems, and having no direct connectivity with one another.

BACKGROUND

Migration of data between database environments may pose a variety of challenges. For example, different database environments may include different database management systems, different encryption properties, different table prefixes, sizes, and/or row capacities, and the like. Additionally, certain migration systems and methods may require simultaneous connectivity to both a source environment and a target environment.

The present disclosure is directed to addressing one or more of these challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In some embodiments of the present disclosure, a method is disclosed for migrating data from a source environment to a target environment, the source and target environments having differing database management systems and being disposed on separate networks that are disconnected from one another. The method may include: identifying data for migration in the source environment, wherein identifying the data comprises identifying tables having a predetermined prefix value; setting customized properties in a data migration utility based on the data; creating a shell for the data in the target environment; using the data migration utility, creating an intermediary representation of the data; copying the intermediary representation to the target environment; and using the data migration utility, restoring the data from the intermediary representation into the shell in the target environment.

The step of setting customized properties in the data migration utility may include providing the data migration utility with at least one of: a maximum pool size; a placeholder to include in place of null values in an intermediary representation of the data; and a number of records to retrieve from the database of the source environment. The step of restoring the data from the intermediary representation may include: reading columns of the identified tables in the source environment; reading columns in tables of the shell in the target environment; and restoring data corresponding to columns in both the columns of the identified tables in the source environment and columns in tables of the shell in the target environment. Additionally or alternatively, the step of restoring the data from the intermediary representation may include: creating a table including a column of restored data; and creating a second column with hashed values corresponding to the column of restored data. Additionally or alternatively, the step of creating the intermediary representation of the data may include merging contents of at least two rows of a data table in the source environment, and restoring the data from the intermediary representation may include splitting the merged contents into at least two rows of a data table in the target environment. Additionally or alternatively, the data for migration in the source environment may include data repository metadata and a platform analytics tool. Additionally or alternatively, the source environment may be managed using MySQL and/or the target environment may be managed using PostgreSQL. Additionally or alternatively, the step of setting customized properties in a data migration utility may be performed using a processor external to each of the source and target environments. Additionally or alternatively, the method may include validating the restored data by performing a row-by-row comparison of data in a table in the target environment to data in a table in the source environment. Additionally or alternatively, the source environment and the target environment may include differing encryption properties, and the method may include preserving the differing encryption properties in the restored data in the target environment.

In some embodiments of the present disclosure, a method of migrating data from a source environment to a target environment may include: identifying data for migration in a database of the source environment; using a processor external to the source and target environments, setting customized properties in a data migration utility based on the data, wherein the customized properties include one at least one of: a maximum pool size; a placeholder to include in place of null values in an intermediary representation of the data; and a number of records to retrieve from the database of the source environment; creating a shell for the data in the target environment; using the data migration utility, creating the intermediary representation of the data; copying the intermediary representation to the target environment; and using the data migration utility, restoring the data from the intermediary representation into the shell in the target environment.

The intermediary representation may be a comma-separated values (CSV) file, and restoring the data from the intermediary representation may include populating a first column of a table with data from the CSV file and a second column of the table with hashed values corresponding to the first column of data. Additionally or alternatively, creating the intermediary representation of the data may include merging contents of at least two rows of a data table in the source environment into a single comma-separated value. Additionally or alternatively, the data for migration in the source environment may include a platform analytics tool, and the method may further include: validating the restored data by performing a row-by-row comparison of data in a table in the target environment to data in a table in the source environment. Additionally or alternatively, the source environment may include a first encryption property set and the target environment may include a second encryption property set, and the method may include merging the first encryption property set and the second encryption property set for the restored data in the target environment.

In some embodiments, a system may include: one or more processors; and one or more computer-readable media comprising instructions that, when executed by the one or more processors, cause the one or more processors to perform operations for migrating a database from a source environment to a target environment, the operations comprising: identifying data for migration in the source environment; setting customized properties in a data migration utility based on the data; creating a shell for the data in the target environment; using the data migration utility, creating an intermediary representation of the data; copying the intermediary representation to the target environment; and using the data migration utility, restoring the data from the intermediary representation into the shell in the target environment, wherein restoring the data from the intermediary representation includes: creating a table including a column of restored data; and creating a second column with hashed values corresponding to the column of restored data.

In some embodiments, the one or more processors may be external to both the source environment and the target environment. Additionally or alternatively, the data for migration in the source environment may include data corresponding to a platform analytics tool. Additionally or alternatively, the source environment and the target environment may have no connectivity with one another while the operations are performed. Additionally or alternatively, identifying data for migration in the source environment may include identifying tables having a predetermined prefix value.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, multiple advantages to the disclosed systems and methods exist, such as an ability to migrate data between two networks having no connectivity with one another, and/or preservation of data formatting and properties while switching between different database management systems. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
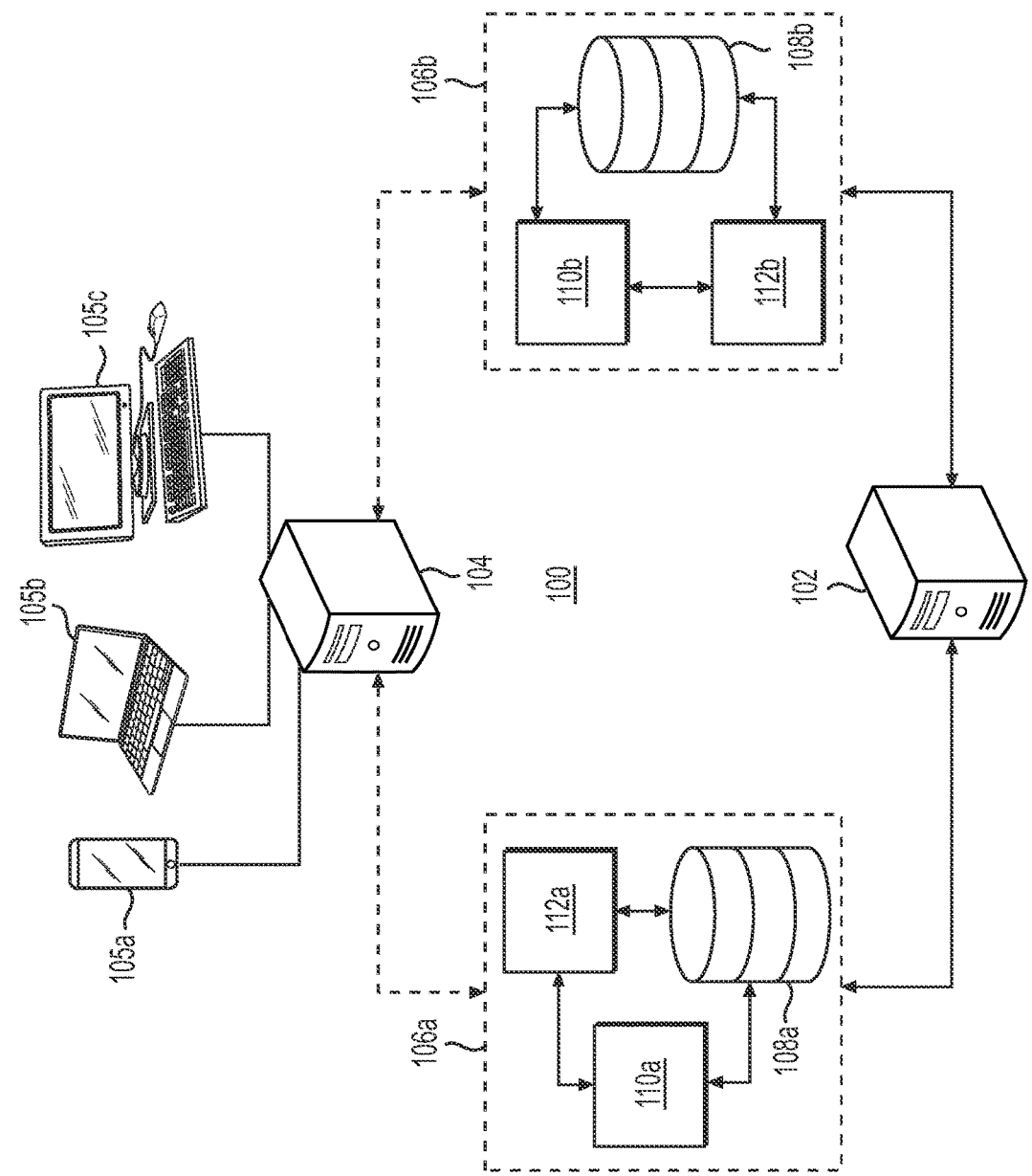
FIG. 1 depicts an exemplary system scheme for database migration, according to one or more embodiments.

Various embodiments of the present disclosure relate generally to migration of data between a source environment and a destination environment. Specifically, embodiments of the present disclosure may relate to migration of data between a source environment and a destination environment having differing database management systems, migration of data between a source environment and a destination environment which are not disposed on the same network (e.g., which have no connection to one another while migration is in progress), migration of data between a source environment and a destination environment having different encryption properties and/or different table structures (e.g., different numbers of columns, different column widths, etc.), and/or migration of data having specific characteristics (e.g., data represented as hashed values, data sequenced in multiple rows, table prefixes, etc.).

An "environment," according to the present disclosure, may include a physical and/or digital space in which data and/or data management tools may be stored or run. An environment may be located on a single computing device (e.g., on a single server, server system, or computer), or across multiple computing devices (e.g., on a plurality of servers/server systems, and/or in a cloud-based system). An environment may include, e.g., one or more databases managed by one or more database management systems (e.g., MySQL, PostgreSQL, Oracle, SQL Server, DB2 SQL, etc.), as well as analytical programs, data regarding the database management system, etc. It will be understood that the data management systems provided herein are examples only and one or more other database management systems may be included in the environment. The environment may be database management system agnostic.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

FIG. 1 depicts an exemplary system scheme 100 for database migration, according to one or more embodiments. System scheme 100 may include a data processor 102 and a server 104. Server 104 may have connectivity with a plurality of user devices 105a, 105b, 105c. Data processor 102 may be capable of connecting to both a source environment 106a and a target environment 106b during, e.g., a data migration process. Source environment 106a may include, e.g., a source database 108a, a source tool 110a, and source tool data 112a. Likewise, target environment 106b may include, e.g., a target database 108b, a target tool 110b, and target tool data 112b.

System scheme 100 includes components that may or may not be connected at different points in time relative to, e.g., migration of data from source environment 106a to target environment 106b. For example, as shown, data processor 102 may be capable of connecting to both source environment 106a and target environment 106b. However, during a data migration process, data processor 102 may not in actuality be connected to both source environment 106a and target environment 106b simultaneously. Likewise, server 104 may be capable of connecting to both source environment 106a and target environment 106b, but during a data migration process, such connectivity may be suspended. Thus, source environment 106a and target environment 106b may be considered to be in different networks (e.g., not connected to one another), at least during a data migration process.

Components of system scheme 100 may each include one or more processors and/or data storage devices located in one or more geographic regions. In some embodiments, for example, components of system scheme 100 may be disposed at a single geographic location (e.g., at a location housing servers belonging to an owner of source environment 106a and/or target environment 106b). In some embodiments, components of system scheme 100 may be disposed at multiple geographic locations (e.g., multiple server location, data processing centers, and/or cloud systems). Components of system scheme 100 may be interconnected with one another and/or within themselves via any digital communications medium, such as via wired or wireless network connections, such as local area network (LAN), wide area network (WAN), Bluetooth, cellular data, and/or other types of connections.

Data processor 102 may be any suitable computing device capable of sending data to, receiving data from, and/or coordinating a data backup and restore process for, source environment 106a and target environment 106b. In some embodiments, data processor 102 may have a wired or wireless connection with source environment 106a and/or target environment 106b. Each connection may be activated (i.e., connecting data processor 102 with source environment 106a or target environment 106b) or broken (i.e., disconnecting data processor 102 from source environment 106a or target environment 106b), independently from one another. Data processor 102 may thereby connect with either one or the other of source environment 106a or target environment 106b while a method to back up data stored in source environment 106a and restore it to source environment 106b is underway, and/or may connect with either or both of source environment 106a or target environment 106b before backup of data from source environment 106a has begun or after restoration of the data to target environment 106b is complete. In some embodiments, a connection between data processor 102 and source environment 106a and/or target environment 106b may be secured by, e.g., encryption.

Server 104 may be any suitable computing device capable of connecting source environment 106a and/or target environment 106b with other devices, e.g., via a network. In some embodiments, for example, server 104 may serve as an intermediary between an environment 106a or 106b and one or more user devices 105a, 105b, 105c. For example, in some embodiments, server 104 may be a network server, on a local area network, or on a wide area network such as the Internet. In some embodiments, server 104 may control, manage, or route information (e.g., queries, instructions, data, analytics, etc.) between devices 105a, 105b, 105c and source environment 106a and/or target environment 106b. In such embodiments, server 104 may include one or more processors tasked with managing workflow between devices 105a, 105b, 105c and source environment 106a and/or target environment 106b. In some embodiments, server 104 might not be connected to source environment 106a and/or target environment 106b during data migration processes between source environment 106a and target environment 106b.

While data processor 102 and server 104 may be separate devices, as depicted in FIG. 1, it is contemplated that data processor 102 and server 104 may be the same device or the same plurality of devices (e.g., the same cloud-based network of processors). Generally, between data processor 102 and server 104, connections between source environment 106a, target environment 106b, and other devices 105a, 105b, 105c may be managed independently of one another.

One or more of devices 105a, 105b, 105c may be configured to receive inputs from and present outputs to, e.g., a user and/or a further device. For example, devices 105a, 105b, 105c may include one or more input components (e.g., keyboards, mice, touchscreens, data connections) and one or more output components (e.g., audio, visual, tactile, or data outputs). Devices 105a, 105b, 105c may include, e.g., personal computers (laptops, desktops, and/or other personal computing devices), tablets, smartphones, smart watches, wearable computing devices (e.g., glasses), virtual reality devices, augmented reality devices, and/or any combination thereof. In some embodiments, one or more of devices 105a, 105b, 105c may be configured to display data generated by, analyzed by, and/or stored in source environment 106a and/or target environment 106b, and further processed by, e.g., server 104. In some embodiments, one or more of devices 105a, 105b, 105c may be configured to analyze, format, sort, and/or present data stored in source environment 106a and/or target environment 106b. For example, one or more of devices 105a, 105b, 105c may include an application, a web browser, or another program configured to format, analyze, display, and/or otherwise manipulate data.

Source environment 106a and target environment 106b may be digital environments located on one more computing devices (e.g., processors, servers, data storage systems, cloud computing systems, etc.). Each environment may include data structures (e.g., database structures) organized according to one or more database management systems, for storing, organizing, manipulating, and/or analyzing data. Components of each environment may be connected to one another via one or more data connections, allowing for organizing, manipulating, and/or analyzing data stored within each environment. For example, source environment 106a may include source database 108a, source tool 110a, and source tool data 112a. Source database 108a may be any electronically-stored organizational structure for data, managed by a database management system, such as MySQL, PostgreSQL, Oracle, SQL Server, DB2, or the like. Source tool 110a may be a software tool (e.g., an application) configured to analyze, manipulate, draw conclusions from, and/or otherwise work with data stored in source database 108a, and/or analyze, manipulate, draw conclusions from, and/or otherwise work with data that characterizes the use of source database 108a (e.g., by users of devices such as devices 105a, 105b, 105c). In some embodiments, for example, source tool 110a may be an analytics tool configured to provide analytics about the usage of database 108a (e.g., frequency of use, type of data accessed, etc.). Source tool data 112a may include data that is generated based on the use of source database 108a. For example, source tool data 112a may include data that characterizes the use of source database 108a. Such data may be used by source tool 110a to analyze the functioning, use, and/or other characteristics of source database 108a and/or its users. In some embodiments, source tool data 112a may be organized and stored in a database, which may have the same database management system as, or a different database management system from, source database 108a.

Likewise, target environment 106b may include target database 108b, target tool 110b, and target tool data 112b. Each of target database 108b, target tool 110b, and target tool data 112b may share characteristics with counterpart components in source environment 106a. However, target database 108b and target tool data 112b may be managed by a different database management system or systems than source database 108a and source tool data 112a, respectively, which may result in some structural and/or organizational differences between source database 108a/source tool data 112a and target database 108b/target tool data 112b. For example, target database 108b may include more or fewer tables or columns for data storage than source database 108a. Additionally, in some embodiments, column capacities/sizes may differ between source database 108a and target database 108b (or other source/target databases). Further, in some embodiments, source database 108a may include data that should or need not be migrated to target database 108b. In an "initial" state, while source environment 106a may be populated by data, target environment 106b may not be populated by data, and may include a structure or structures into which data from source environment 106a may be migrated according to methods described herein.

Figure 2:
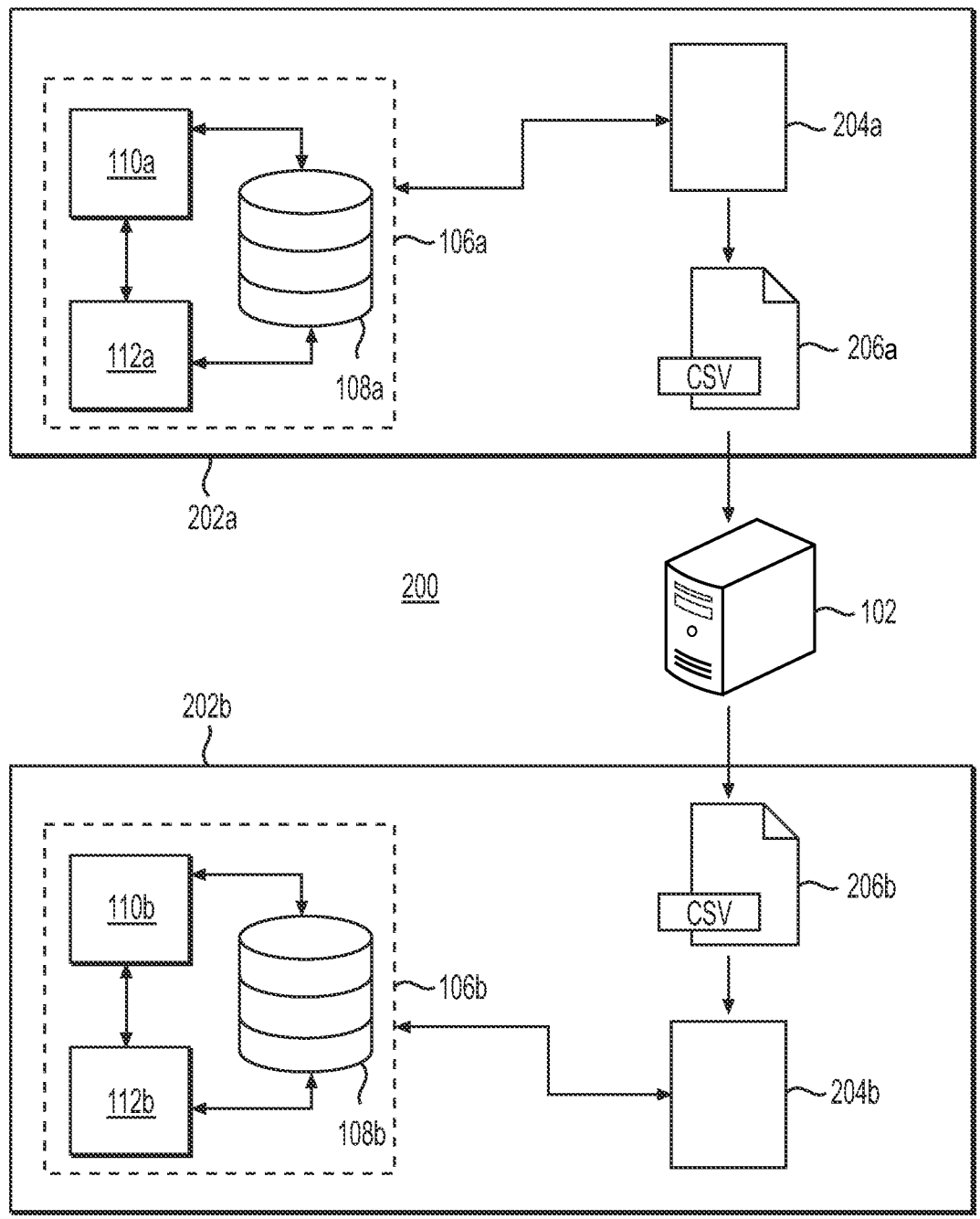
FIG. 2 depicts a process flow diagram for database migration, according to one or more embodiments.

FIG. 2 depicts a process flow diagram 200 for database migration, according to one or more embodiments. In a source-related portion 202a of the process flow, a first instance 204a of a data migration tool may be used to generate one or more intermediary representation(s) 206a of data in components of source environment 106a (including, e.g., parts or all of source database 108a, source tool 110a, and/or source tool data 112a). Intermediary representation(s) 206a may then be copied to create copied intermediary representation(s) 206b, using data processor 102, for use in a target-related portion 202b of the process flow. A second instance 204b of a data migration tool may utilize copied intermediary representation(s) 206b to restore data to components of target environment 106b (including, e.g., parts or all of target database 108b, target tool 110b, and/or target tool data 112b.

A data migration tool (which may be deployed in, e.g., first instance 204a and second instance 204b) may include one or more executable programs configured to perform steps to migrate data from source environment 106a to target environment 106b. A single data migration tool may include utilities to both generate intermediate representation(s) 206a and restore data from copied intermediary representation(s) 206b into target environment 106b. Moreover, first instance 204a and second instance 204b may include utilities to migrate data (e.g., from source database 108a to target database 108b), tools (e.g., to migrate aspects, settings, data, etc. of source tool 110a to target tool 110b), and tool data (e.g., to migrate source tool data 112a to target environment 106b to create target tool data 112b). Either first instance 204a or second instance 204b of the data migration tool may also be capable of copying intermediary representation(s) 206a to create intermediary representation(s) 206b. In some embodiments, first instance 204a may be executed by a processor within source environment 106a and second instance 204b may be executed by a processor within target environment 106b. As both instances 204a, 204b may be instances of the same tool, the tool may include a utility to determine whether the tool is being executed in a source environment (e.g., source environment 106a) or in a target environment (e.g., target environment 106b), and to thereafter execute first instance 204a or second instance 204b, each of which may have differing functions. In some embodiments, the data migration tool may be executed by, e.g., data processor 102, which may have access to either source environment 106a or target environment 106b, or both. In alternative embodiments, first instance 204a and second instance 204b may be two distinct programs, each of which may be executed to perform their respective functions to migrate data from source environment 106a to target environment 106b. Advantageously, aspects of the data migration tool (including the existence of first instance 204a and second instance 204b) may allow for migration of data/tools/etc. from source environment 106a to target environment 106b without there being direct connectivity between source environment 106a and target environment 106b. For example, either or both of source environment 106a and target environment 106b may be "offline" during migration of data/information/tools between them. This may allow for greater security, greater reliability, better troubleshooting, and/or more reliable verification of migration between environments.

First instance 204a and/or second instance 204b of the data migration tool may include specific functions and processes to successfully migrate data and tools from source environment 106a to target environment 106b. For example, as is further described elsewhere herein, there may be differences in the structure of source database 108a and target database 108b, in part due to differences between database management systems utilized in source environment 106a and target environment 106b. For example, character limits in source database 108a and target database 108b may differ, such that data entries in source database 108a may have been split across multiple rows and may need to be merged prior to copying them to target database 108b, and/or may need to be split or re-split after copying them to target database 108b. The data migration tool (either first instance 204a, second instance 204b, or both) may be configured to perform such operations. As another example, columns existing in source database 108a may differ somewhat from columns existing in target database 108b. For example, source database 108a may include more columns or fewer columns than target database 108b. The data migration tool (e.g., both first instance 204a and second instance 204b) may be configured to ignore columns not having counterparts in both source database 108a and target database 108b. As yet another example, in some instances, source environment 106a may include data, data tables, or columns of data having identifying characteristics intended to indicate that such data/tables/columns should be migrated to target environment 106b (e.g., prefixes appended to such data/tables/columns). The data migration tool (e.g., the first instance 204a) may be configured to recognize such prefixes and copy/migrate data associated with such prefixes.

Intermediary representation(s) 206a and copied intermediary representation(s) 206b (collectively referred to as data representations 206) may include one or more files representing data from source environment 106a in a format which can be moved to target environment 106b. Intermediary representation(s) 206a and copied intermediary representation(s) 206b may share substantially the same characteristics other than existing in different environments (e.g., source environment 106a and target environment 106b). Data representations 206 may have recognized file formats, such as comma-separated values (CSV) file formats, tab-delineated (TAB) file formats, extensible markup language (XML) file formats, or any other suitable file formats that may be copyable between source environment 106a and target environment 106b (e.g., that may be simple enough to contain a large amount of data while still being copyable across environments) and while preserving some data formatting as needed.

Figure 3A:
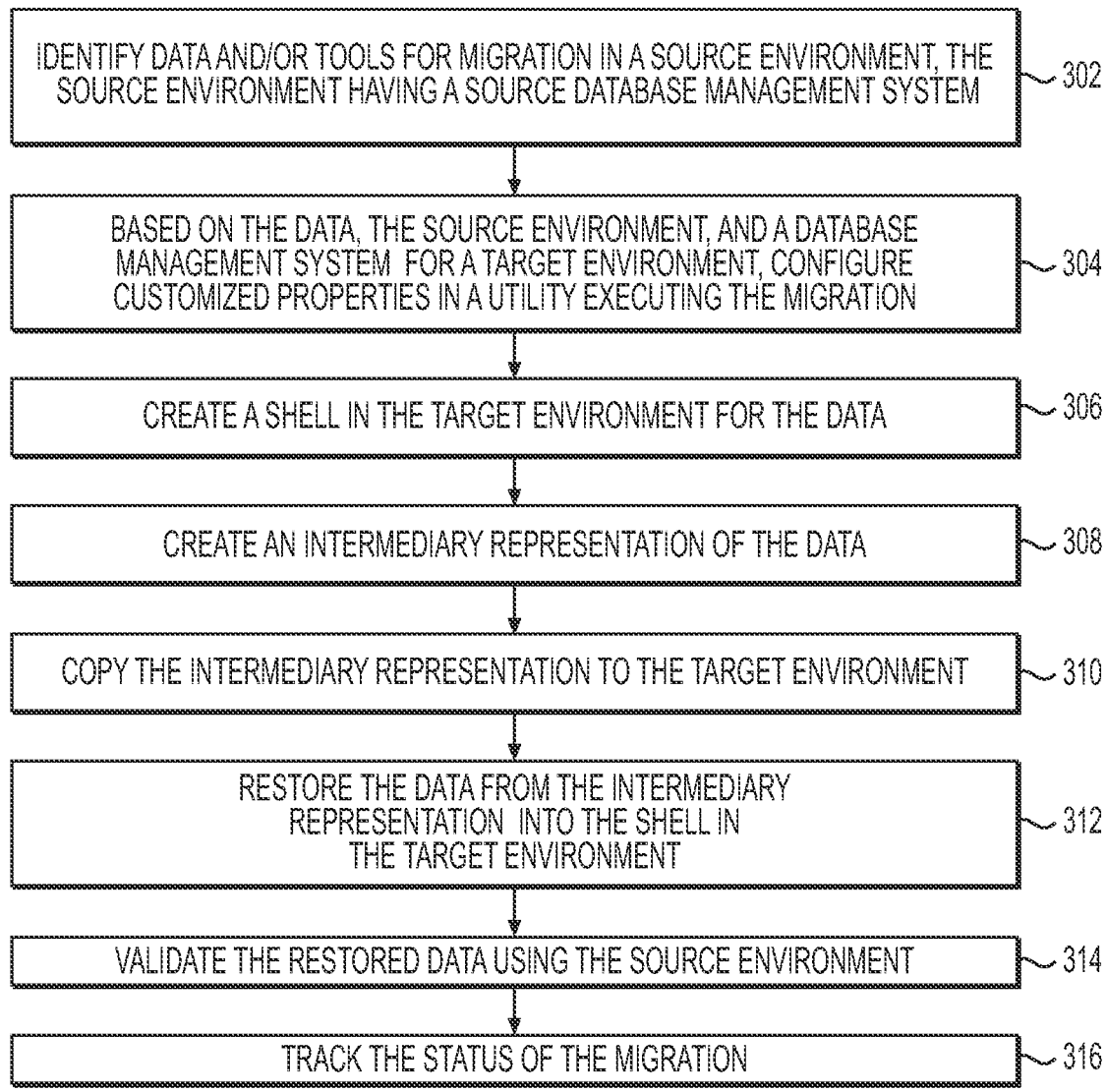
FIG. 3A depicts a flow chart of a method for database migration, according to one or more embodiments.

FIG. 3A depicts a flow chart of a method 300 for database migration, according to one or more embodiments. In some embodiments, a data migration tool (e.g., first instance 204a and second instance 204b) may perform aspects of this method, e.g., in conjunction with a source environment and a target environment (e.g., environments 106a, 106b), the source environment including data in a source database (e.g., source database 108a). In some embodiments, the data migration tool (e.g., each instance thereof) may be initiated, managed, and/or monitored by a supervising user or program. For example, in some embodiments, a supervising user or program may instruct a computer system within the source environment to execute a first instance of the data migration tool, and may later instruct a computer system within the target environment to execute a second instance of the data migration tool. A supervising user or program may also instruct a computer system (e.g., data processor 102) to copy one or more intermediary representation(s) of data from the source environment to the target environment.

According to step 302, data and/or tools for migration may be identified in a source environment (e.g., source environment 106a), the source environment having a source database management system. The data and/or tools for migration may include any data previously described herein, such as, e.g., data in source database 108a, source tool 110a, and/or source tool data 112a. In some embodiments, the step of identifying data and/or tools for migration may be accomplished by a supervisory user or program. In other embodiments, however, this step may be performed by, e.g., an instance of a data migration utility run in the source environment. The identifying step may include, e.g., identifying data having a tag, such as a particular table prefix, indicating that the data associated with the tag should be migrated. For example, the identifying step may include identifying data in tables having a predetermined prefix as data that should be migrated. In other embodiments, the identifying step may include identifying all data in a database within a source environment for migration to a target environment. Identified data and tools may include specific characteristics, such as, e.g., hashed values, split, sequenced data entries, table prefixes, encryption properties and security policies, etc.

According to step 304, based on the data, the source environment, and a database management system for a target environment, customized properties may be configured in a utility executing the migration. The utility executing the migration may include, e.g., a data migration tool, as has been described elsewhere herein. Configuring customized properties may include, e.g., setting values that instruct a utility as to the size, metes, and bounds of the data/tools/etc. to be migrated. For example, configuring customized properties may include, e.g., specifying a maximum pool size indicating a maximum number of database connections to create in a target environment; specifying a null value (e.g., for use in an intermediary representation, such as a CSV file), specifying a page size (e.g., a size indicating a maximum number of records to fetch at a time), and/or specifying any other parameters of the source environment, the target environment, or the move. Advantageously, configuring customized properties may allow for optimization of data retrieval speeds, database organization, or other database management characteristics. Additionally, configuring customized properties may allow for data to be migrated in a particular way (e.g., null values may be represented in a known fashion, to prevent confusion between empty cells in a target environment and cells into which null values from a source environment have been imported). Such properties may depend in part on the data, tools, etc. to be migrated, and/or in part on the database management system of the target environment.

According to step 306, a shell may be created in the target environment for the data. The shell may include data structures configured to house data and tools migrated from the source environment. In some embodiments, the shell may be created by a program independent of the data migration tool, such as a program configured to execute database management commands. In other embodiments, the shell may be created by the data migration tool. In some embodiments, the shell may be created by, e.g., an individual user. The shell may include any organizational structure or schema for housing data, tools, etc. to be migrated, e.g., a structure for a target database (e.g., target database 108b), storage and/or a data structure for a target tool (e.g., target tool 110b), and/or a structure for storing target tool data (e.g., target tool data 112b). The structure of the shell may include one or more tables to be populated by data, and the particular characteristics of the one or more tables may depend on, e.g., a database management system for the target environment. As has been previously noted, the shell may include a relational database that differs in some respects from a source database, e.g., based on a number of columns or tables in the database, and/or the type of database management system associated with the database. While the shell should generally correspond with a data structure in a source environment, there may be a potential for mismatch due to such differences.

According to step 308, an intermediary representation of the data may be created. The intermediary representation (e.g., intermediary representation(s) 206a) may include one or more files in a format configured to reflect the data and its organization within a source database (e.g., source database 108a). As has been described elsewhere, such an intermediary representation may have any suitable file format, such as a CSV file, a TAB file, an XML file, or the like. In some embodiments, for example, a plurality of CSV files may be generated reflecting a plurality of tables of the data to be migrated. In some embodiments, this step may be performed by, e.g., an instance of a data migration tool run within the source environment (e.g., first instance 204a). The step of creating an intermediary representation may, in some instances, include detecting certain formatting or alterations applied to data in a source environment, such as detecting a data entry that has been split across multiple rows of a table, detecting prefixes to data or other identifiers of data (e.g., a prefix of a table name) that should be included within an intermediary representation, or the like. In such instances, the step of creating an intermediary representation may include taking an action based on the detected formatting or alterations. For example, if a data entry has been split across multiple rows in a table, then the step of creating an intermediary representation may include merging the split data entry into a single entry in the intermediary representation. As another example, if an identifier of data that should be included within an intermediary representation is detected, then the step of creating an intermediary representation may include ensuring that such data is included within the intermediary representation, optionally while excluding other data from the intermediary representation.

In some embodiments, the step of creating an intermediary representation may include creating an intermediary representation of multiple databases from the source environment. For example, an intermediary representation may be created of a first database containing data (e.g., source database 108a), and a second database containing data related to an analytical tool (e.g., source tool data 112a). Additionally or alternatively, the step of creating an intermediary representation may include creating an intermediary representation of data about a tool itself (e.g., source tool 110a), such as settings, preferences, historical data, or the like. In some instances, the step of creating an intermediary representation may also or alternatively include encrypting the intermediary representation, or otherwise adding a security feature to it.

According to step 310, the intermediary representation may be copied to the target environment. This step may be performed by, e.g., a processor external to the source environment, such as data processor 102 of system scheme 100. In some embodiments, no connectivity (e.g., via a wired or wireless network connection) may exist between the source environment and the target environment during this step (or during other steps of method 300). Alternatively, the intermediary representation may be created in the target environment, rather than created in the source environment and copied. Alternatively, the intermediary representation may be created in a third environment, and then copied to the target environment.

According to step 312, the data from the copied intermediary representation may be restored into the shell in the target environment. This step may be performed by, e.g., an instance of the data migration tool run in the target environment (e.g., instance 204b of a data migration tool). Restoring the data from the copied intermediary representation may include populating the shell in the target environment with data from the intermediary representation based on, e.g., customized properties of the data migration tool and other factors. In some embodiments, restoring the data may include performing specific functions to restore or maintain particular characteristics of the data, fit the data to the shell, ensure that specialized formatting of the data is preserved, etc. Such specific functions are described in more detail with reference to FIG. 3B.

According to step 314, the restored data may be validated using the source environment. For example, the restored data may be compared to the data in the source environment to ensure that migration of the data has maintained the data's integrity and has been completed. This step may be performed once restoration of data is presumed to be complete, or, alternatively, may be performed once restoration of data is presumed to have reached a predetermined checkpoint or midway point. In some embodiments, this step may include verifying that all data structures existing in both the source environment and the target environment include the same data. This step may be performed by, e.g., a processor having the ability to connect to both the source environment and the target environment (e.g., data processor 102), such that detailed comparisons of data may be made between the source environment and the target environment. For example, in some embodiments, a processor having the ability to connect to both the source environment and the target environment may perform a row-by-row comparison of tables existing in both the source environment and the target environment. In some embodiments, if a discrepancy is found between the source environment and the target environment, an error may be returned (e.g., to a user or processor supervising the process).

According to step 316, the status of the migration may be tracked. Although depicted at the end of method 300, step 316 may be performed simultaneously with one or more of the other steps in method 300. In some embodiments, this step may be performed by, e.g., a processor having connectivity with either or both of the source environment and the target environment. In some embodiments, this step may include monitoring for an unexpected mismatch or discrepancy between the source environment and the target environment, such as a mismatch between tables or columns. In some embodiments, if a mismatch or discrepancy is detected, the mismatch or discrepancy may be logged or an error may be returned (e.g., to a user or processor supervising the process). The migration may continue even if a discrepancy is detected, or may be halted.

It will be understood that one or more steps of any flowchart provided herein (e.g., flowchart 300 of FIG. 3A) may be performed in an order different than the order shown in the flowchart. For example, step 308 of FIG. 3A may be performed prior to step 306 such that an intermediate representation of the data is created at step 308 before a shell in the target environment for the data is created at step 306.

Figure 3B:
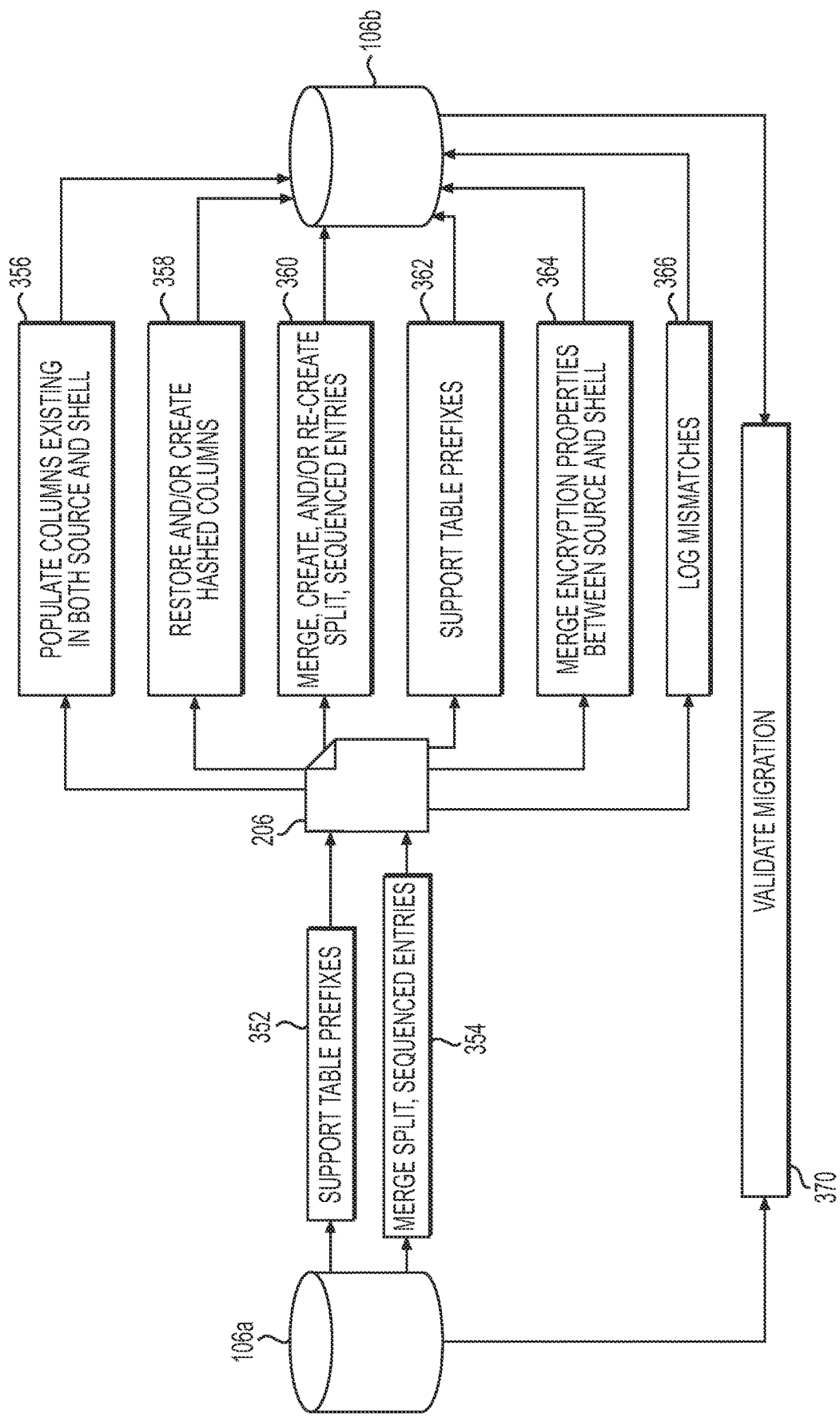
FIG. 3B depicts a process flow diagram for backing up and restoring data, according to one or more embodiments.

FIG. 3B depicts a process flow diagram for backing up and restoring data, according to one or more embodiments. The process of backing up and restoring data may include management of the data to ensure that the backing up and restoration processes properly account for how the data is initially organized in a source environment and how it should be organized in a target environment, which data should be backed up and restored, and/or any particular organizational/management characteristics that differentiate or characterize the source and target environments (e.g., differing database management systems, differing table sizes, column sizes, space limits, etc.). In creating a data representation 206 from source environment 106a, table prefixes existing in source environment 106a may be supported (step 352). As has been described elsewhere herein, this step may include recognizing certain prefixes in the names of tables in source environment 106a, and backing up data from tables having those prefixes in their names, while ignoring tables without those prefixes. In some embodiments, this step may include appending certain prefixes to the names of tables which are backed up. Additionally or alternatively, split, sequenced entries may be merged (step 354). As has been described elsewhere herein, data entries existing in a source environment may be larger than the provided capacity of a location in which they are stored (e.g., a row of a table). As such, data entries may be split and stored in sequence across multiple rows of a table. As a part of backing up such data entries, they may be merged into a single entry in an intermediary representation, as it may not be necessary or preferable to preserve their split, sequenced configuration.

In restoring data from data representation 206 to target environment 106b, steps may be taken to populate columns existing in both source and shell tables (step 356). In other words, if a column or group of columns exists only in a table in source environment 106a and not in target environment 106b, or likewise only in target environment 106b and not in source environment 106a, a process of restoring data from data representation 206 to target environment 106b may ignore such column or columns, as well as data for population of such column or columns. Optionally, the process may also include creating and/or outputting a notification, log, or other indicator that a column or group of columns, and/or data for a column or group of columns, creates a mismatch between source environment 106a and target environment 106b. In other words, mismatches may be logged (step 366). These steps may account for slight differences in the number, type, and/or organization of tables in between source environment 106a and target environment 106b.

As another step in restoring data, hashed columns may be restored and/or created (step 358). Hashed columns, according to the present disclosure, may refer to columns in which data (e.g., data in another, non-hashed column) is represented by an indexable hashed value. This may account for the fact that only a certain number of characters in a column of data are indexable. Hashed columns may thus exist to preserve data having more than an indexable number of characters in an indexable fashion. As a part of a restoration process, therefore, hashed columns in data representation 206 may be preserved, and/or new hashed columns based on existing non-hashed data in data representation 206 may be created using, e.g., a hashing algorithm.

As further steps in restoring data, split, sequenced entries may be merged, created, and/or re-created (step 360). As has been described with respect to step 354, data capacity in a single row or cell may be limited in either source environment 106a or target environment 106b, or both. Therefore, data entries exceeding the capacity of a single row may be split and sequenced across multiple rows as a part of the restoration process. Such data entries may or may not have been split and sequenced in source environment 106a. Additionally or alternatively, table prefixes may be supported (step 362). Data may be restored to tables having a predetermined prefix in their names, for example, while other tables may be ignored. As another step in restoring data, encryption properties between source and shell tables may be merged (step 364). Thus, advantageous encryption protection from both source environment 106a and target environment 106b may be preserved. After data has been backed up and restored, the migration of data may be validated (step 370). Validation may include, e.g., row-by-row validation of a table. Data in target environment 106b that corresponds to data in source environment 106a may be identified and compared. If a mismatch is found, then an identification of the mismatch may be generated, e.g., in a log or notification. If no mismatch is found, then once all data has been compared, a notification that validation is complete may be generated. Notifications may be generated to, e.g., a processor or user supervising the backup and restoration process.

Figure 4:
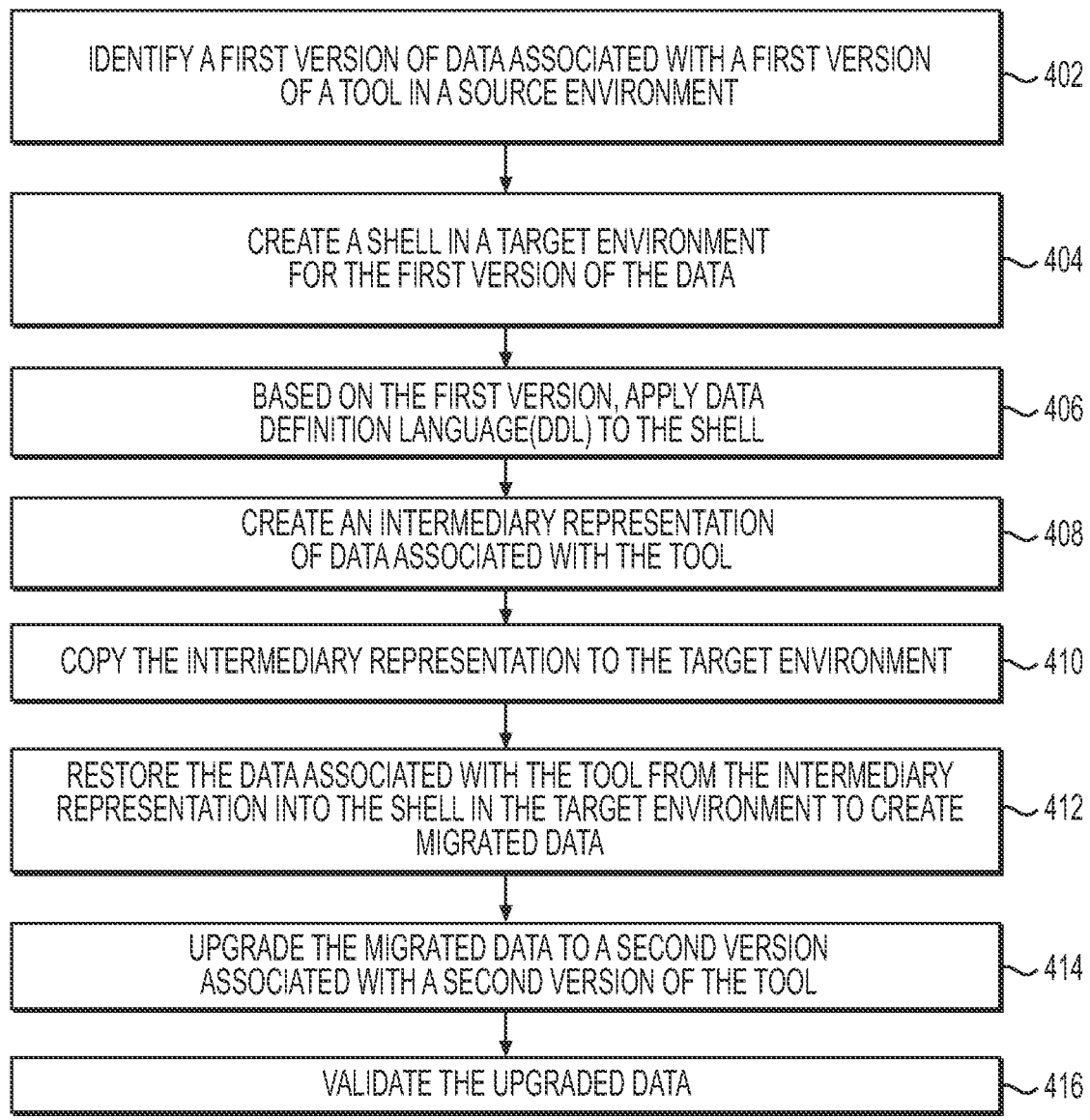
FIG. 4 depicts a flow chart of a method for migrating and upgrading data associated with an analytical tool, according to one or more embodiments.

As has been alluded to, both data and tools may be migrated using the systems and methods disclosed herein. FIG. 4 depicts a flow chart of a method 400 for migrating and upgrading data associated with an analytical tool (e.g., source tool data 112a to target tool data 112b), according to one or more embodiments. The steps of FIG. 4 may be performed in conjunction with, in addition to, or instead of other steps in a method for migrating data (e.g., steps depicted in FIGS. 2, 3A, and 3B). According to step 402, a first version of data associated with a first version of a tool in a source environment may be identified. This may be performed in a manner similar to step 302 of method 300. In some embodiments, the identified data may be in a self-contained database, separate from other data migrated according to the present disclosure. In some embodiments, data may be identified by tagging or adding a prefix to tables including the data. According to step 404, a shell for the first version of the data may be created in a target environment. This may be performed in any manner similar to step 306 of method 300. According to step 406, based on the first version of the data, a data definition language (DDL) may be applied to the shell. This step may include, e.g., populating default values in the shell using the DDL, depending on, e.g., a version, type, or other characteristic of the first version of the data in the source environment. In some embodiments, a similar step may be performed with respect to, e.g., a shell created as a part of method 300.

According to step 408, an intermediary representation of data associated with the tool may be created. This may likewise be performed in any manner similar to, e.g., step 308 of method 300, and may include steps analogous to the steps shown in, or described with respect to, FIGS. 2 and 3B (e.g., steps 352, 354, or creation of intermediary representation 206a). According to step 410, the intermediary representation may be copied to the target environment. This may likewise be performed in any manner similar to, e.g., step 310 of method 300, and may include steps analogous to the steps shown in, or described with respect to, FIG. 2 (e.g., creation of intermediary representation copy 206b). According to step 412, the data associated with the tool from the intermediary representation may be restored into the shell in the target environment to create migrated data. This may be performed in any manner similar to, e.g., step 312 of method 300, and may include steps analogous to the steps shown in, or described with respect to, FIG. 3B (e.g., steps 356, 358, 360, 362, 364, 366). According to step 414, the migrated data may be upgraded to a second version associated with a second version of the tool. Upgrading the migrated data may include, e.g., running a program in the target environment to effect certain changes in the formatting or contents of the data, rendering it compatible with the second version of the tool. According to step 416, the upgraded data may be validated. This may be performed in any manner similar to, e.g., step 314 of method 300, and/or step 370 as shown in FIG. 3B.

Systems and methods of the present disclosure may offer various technical advantages. For example, methods of the present disclosure may improve or allow for migration of data between source and target environments that are disposed on separate networks having no direct connection with one another. Advantageously, this may allow for greater security and integrity of a source and/or target environment, and for greater security of data to be migrated. Additionally or alternatively, this may allow for back-up of a source environment and restoration of a target environment in separate, non-parallel stages (e.g., back-up may be done at one time and restoration may be done at a much later time, and/or back-up and restoration may be performed under differing users, administrators, or other surveillance). This may be particularly useful in cases where a large amount of data is to be migrated, and live back-up and restoration may be less practical. Additionally or alternatively, this may allow for back-up and restoration of data between environments having different software and/or hardware configurations (e.g., from an environment stored on a single-location server system to a cloud-based target environment). Additionally or alternatively, systems and methods of the present disclosure may allow for migration of data between source and target environments having different database structures (e.g., different tables, different columns, different column widths, etc.) with a reduced likelihood of errors in data migration. Additionally or alternatively, systems and methods of the present disclosure may allow for identification of data for migration, and successful migration of such data, when such data is stored in a source environment including other data that should not be migrated.

Aspects of the present disclosure may be embodied in one or more special purpose computers and/or data processors that are specifically programmed, configured, and/or constructed to perform one or more of the computer-executable instructions explained in detail herein. While aspects of the present disclosure, such as certain functions, are described as being performed exclusively on or by a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media. Therefore, whenever a method is described in this disclosure, this disclosure shall also be understood as describing a non-transitory computer-readable medium storing instructions that, when executed by one or more processors, cause the one or more processors to perform the computer-implemented method. Non-transitory computer-readable media may include, e.g., magnetically or optically readable computer discs, hard-wired or preprogrammed chips (e.g., EEPROM semiconductor chips), nanotechnology memory, biological memory, or other data storage media. A non-transitory computer-readable medium may be part of the memory of a computer system or separate from any computer system. In some embodiments, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 5:
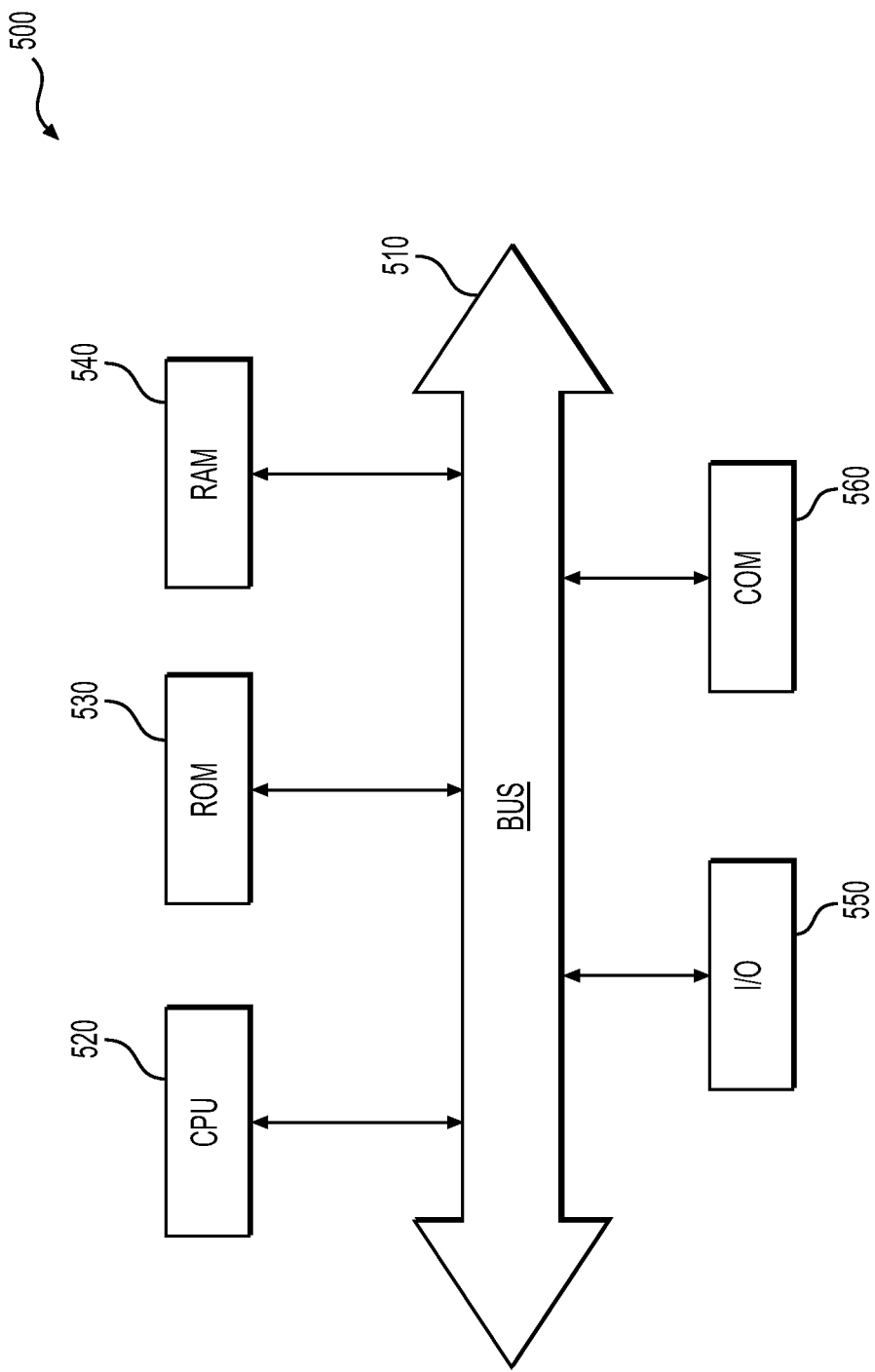
FIG. 5 depicts, in diagram form, a computing system according to aspects of the present disclosure.

FIG. 5 illustrates an example of a computing device 500 of a computer system which may be implemented into other aspects of the present disclosure (e.g., as data processor 102, server 104, devices 105a, 105b, 105c, or other aspects of the present disclosure). Computing device 500 may include processor(s) 520 (e.g., CPU, GPU, or other such processing unit(s)), memory 530/540, and communication interface(s) 560 (e.g., a network interface) to communicate with other devices. Memory 530/540 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 530/540. Computing device 500 may, in some embodiments, further include input device(s) 550 (e.g., a keyboard, mouse, or touchscreen) and/or output device(s) (e.g., a display, printer). The aforementioned elements of computing device 500 may be connected to one another through a bus 510, which represents one or more busses. In some embodiments, processor(s) 520 of the computing device 500 include(s) a CPU a GPU, or both.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain exemplary embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be repeated, added to, or deleted from methods described within the scope of the present disclosure. The true scope and spirit of the invention is indicated by the following claims.

What is claimed is:

1. A method of migrating data from a source environment to a target environment, the source and target environments having differing database management systems and being disposed on separate networks that are disconnected from one another, the method comprising:
   identifying data for migration in the source environment, the source environment having a first relational database, wherein identifying the data comprises identifying tables having a predetermined prefix;
   setting customized properties in a data migration utility based on the data and performed using a processor external to each of the source and target environments;

creating a shell for the data in the target environment, the shell comprising shell data that characterizes a functioning of a database of the data in the source environment and users of the database of the data in the source environment including a frequency of use of the database and a type of data accessed by the users, the target environment having a second relational database different than the first relational database;

using the data migration utility, creating an intermediary representation of the data by detecting formatting differences between the source environment and the target environment;

copying the intermediary representation to the target environment; and using the data migration utility, restoring the data from the intermediary representation into the shell in the target environment.

2. The method of claim 1, wherein the step of setting customized properties in the data migration utility comprises providing the data migration utility with at least one of:
a maximum pool size;
a placeholder to include in place of null values in an intermediary representation of the data; and
a number of records to retrieve from the database of the source environment.

3. The method of claim 1, wherein restoring the data from the intermediary representation comprises:
reading columns of the identified tables in the source environment;
reading columns in tables of the shell in the target environment; and
restoring data corresponding to columns in both the columns of the identified tables in the source environment and columns in tables of the shell in the target environment.

4. The method of claim 1, wherein restoring the data from the intermediary representation comprises:
creating a table including a column of restored data; and
creating a second column with hashed values corresponding to the column of restored data.

5. The method of claim 1, wherein creating the intermediary representation of the data includes merging contents of at least two rows of a data table in the source environment, and
wherein restoring the data from the intermediary representation includes splitting the merged contents into at least two rows of a data table in the target environment.

6. The method of claim 1, wherein the data for migration in the source environment includes data repository metadata and a platform analytics tool.

7. The method of claim 1, further comprising:
validating the data by performing a row-by-row comparison of data in a table in the target environment to data in a table in the source environment.

8. The method of claim 1, wherein the source environment and the target environment include differing encryption properties, and wherein the method includes preserving the differing encryption properties in the data in the target environment.

9. A method of migrating data from a source environment to a target environment, the method comprising:
identifying data for migration in a database of the source environment, the source environment having a first relational database;
using a processor external to the source and target environments, setting customized properties in a data migration utility based on the data and performed using a processor external to each of the source and target environments, wherein the customized properties include one at least one of:
a maximum pool size;
a placeholder to include in place of null values in an intermediary representation of the data; and
a number of records to retrieve from the database of the source environment;

creating a shell for the data in the target environment, the shell comprising shell data that characterizes a functioning of a database of the data in the source environment and users of the database of the data in the source environment including a frequency of use of the database and a type of data accessed by the users, the shell data that characterizes a functioning of a database of the data in the source environment and users of the database of the data in the source environment comprising a type of data accessed by the users, the target environment having a second relational database different than the first relational database;

using the data migration utility, creating the intermediary representation of the data by detecting formatting differences between the source environment and the target environment;

copying the intermediary representation to the target environment; and using the data migration utility, restoring the data from the intermediary representation into the shell in the target environment.

10. The method of claim 9, wherein the intermediary representation is a comma-separated values (CSV) file, and wherein restoring the data from the intermediary representation comprises:
populating a first column of a table with data from the CSV file and a second column of the table with hashed values corresponding to the first column of data.

11. The method of claim 9, wherein the intermediary representation is a comma-separated values (CSV) file, and wherein creating the intermediary representation of the data includes merging contents of at least two rows of a data table in the source environment into a single comma-separated value.

12. The method of claim 9, wherein the data for migration in the source environment includes a platform analytics tool, and wherein the method further comprises:
validating the restored data by performing a row-by-row comparison of data in a table in the target environment to data in a table in the source environment.

13. The method of claim 9, wherein the source environment includes a first encryption property set and the target environment includes a second encryption property set, and wherein the method includes merging the first encryption property set and the second encryption property set for the restored data in the target environment.

14. A system comprising:
one or more processors; and
one or more computer-readable media comprising instructions that, when executed by the one or more processors, cause the one or more processors to perform operations for migrating a database from a source environment to a target environment, the operations comprising:
identifying data for migration in the source environment, the source environment having a first relational database;

setting customized properties in a data migration utility based on the data and performed using a processor external to each of the source and target environments;

creating a shell for the data in the target environment, the shell comprising shell data that characterizes a functioning of a database of the data in the source environment and users of the database of the data in the source environment including a frequency of use of the database and a type of data accessed by the users, the target environment having a second relational database different than the first relational database;

using the data migration utility, creating an intermediary representation of the data by detecting formatting differences between the source environment and the target environment;

copying the intermediary representation to the target environment; and using the data migration utility, restoring the data from the intermediary representation into the shell in the target environment, wherein restoring the data from the intermediary representation includes:

creating a table including a column of restored data; and creating a second column with hashed values corresponding to the column of restored data.

15. The system of claim 14, wherein the one or more processors are external to both the source environment and the target environment.

16. The system of claim 14, wherein the data for migration in the source environment includes data corresponding to a platform analytics tool.

17. The system of claim 14, wherein the source environment and the target environment have no connectivity with one another while the operations are performed.

18. The system of claim 14, wherein identifying data for migration in the source environment comprises identifying tables having a predetermined prefix value.

* * * * *

UNITED STATES PATENT AND TRADEMARK OFFICE
CERTIFICATE OF CORRECTION

Page 1 of 1

PATENT NO. : 12,353,288 B2
APPLICATION NO. : 17/207945
DATED : July 8, 2025
INVENTOR(S) : Jay Shah, Michael Hudson and Cezary Raczko It is certified that error appears in the above-identified patent and that said Letters Patent is hereby corrected as shown below:

In the Claims

In Column 18, Line 3, Claim 9 delete the phrase "include one at least one of:" and insert --include at least one of:--

Signed and Sealed this
Twelfth Day of August, 2025

Coke Morgan Stewart
*Acting Director of the United States Patent and Trademark Office*